United States Patent
Wang et al.

(10) Patent No.: US 11,614,742 B2
(45) Date of Patent: Mar. 28, 2023

(54) HEIGHT ESTIMATION USING SENSOR DATA

(71) Applicant: Zoox, Inc., Foster City, CA (US)

(72) Inventors: Chuang Wang, Sunnyvale, CA (US); Yuesong Xie, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 396 days.

(21) Appl. No.: 16/698,055

(22) Filed: Nov. 27, 2019

(65) Prior Publication Data

US 2021/0157321 A1 May 27, 2021

(51) Int. Cl.
| | | |
|---|---|---|
| *G05D 1/02* | (2020.01) | |
| *G01S 17/89* | (2020.01) | |
| *G06T 7/521* | (2017.01) | |
| *G05D 1/00* | (2006.01) | |
| *G01S 13/931* | (2020.01) | |
| *G01S 13/42* | (2006.01) | |

(52) U.S. Cl.
CPC ............. *G05D 1/024* (2013.01); *G01S 13/42* (2013.01); *G01S 13/931* (2013.01); *G01S 17/89* (2013.01); *G05D 1/0094* (2013.01); *G06T 7/521* (2017.01)

(58) Field of Classification Search
CPC ...... G05D 1/024; G05D 1/0094; G06T 7/521; G01S 13/42; G01S 13/931; G01S 17/89
See application file for complete search history.

(56) References Cited

U.S. PATENT DOCUMENTS

| | | | |
|---|---|---|---|
| 8,600,589 B2 * | 12/2013 | Mendez-Rodriguez | ................... G08G 5/025 701/16 |
| 2017/0066449 A1 * | 3/2017 | Lee | ................... B60G 17/02 |
| 2018/0364717 A1 * | 12/2018 | Douillard | ............... G05D 1/024 |
| 2019/0018132 A1 | 1/2019 | Decker et al. | |
| 2019/0113918 A1 | 4/2019 | Englard et al. | |
| 2019/0340775 A1 * | 11/2019 | Lee | ........................ G05D 1/024 |

FOREIGN PATENT DOCUMENTS

CA          3026667 A1     1/2019

OTHER PUBLICATIONS

The PCT Search Report and Written Opinion dated Feb. 19, 2021 for PCT Application No. PCT/US20/61278, 10 pages.
The International Preliminary Report on Patentability for PCT Application No. PCT/US20/61278, dated Jun. 9, 2022, 7 pages.

* cited by examiner

*Primary Examiner* — Ig T An

(74) *Attorney, Agent, or Firm* — Lee & Hayes, P.C.

(57) ABSTRACT

Techniques for estimating a height range of an object in an environment are discussed herein. For example, a sensor, such as a lidar sensor, can capture three-dimensional data of an environment. The sensor data can be associated with a two-dimensional representation. A ground surface can be removed from the sensor data, and clustering techniques can be used to cluster remaining sensor data provided in a two-dimensional representation to determine object(s) represented therein. A height of a sensor object can be represented as a first height based on an extent of the sensor data associated with the object and can be represented as a second height based on beam spreading aspects of the sensor data and/or sensor data associated with additional objects. Thus, a minimum and/or maximum height of an object can be determined in a robust manner. Such height ranges can be used to control an autonomous vehicle.

19 Claims, 7 Drawing Sheets

HEIGHT ESTIMATION USING SENSOR DATA

BACKGROUND

A vehicle can use sensors to capture sensor data to detect objects in an environment. Accurate determinations of object characteristics can assist, for example, an autonomous vehicle to traverse the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
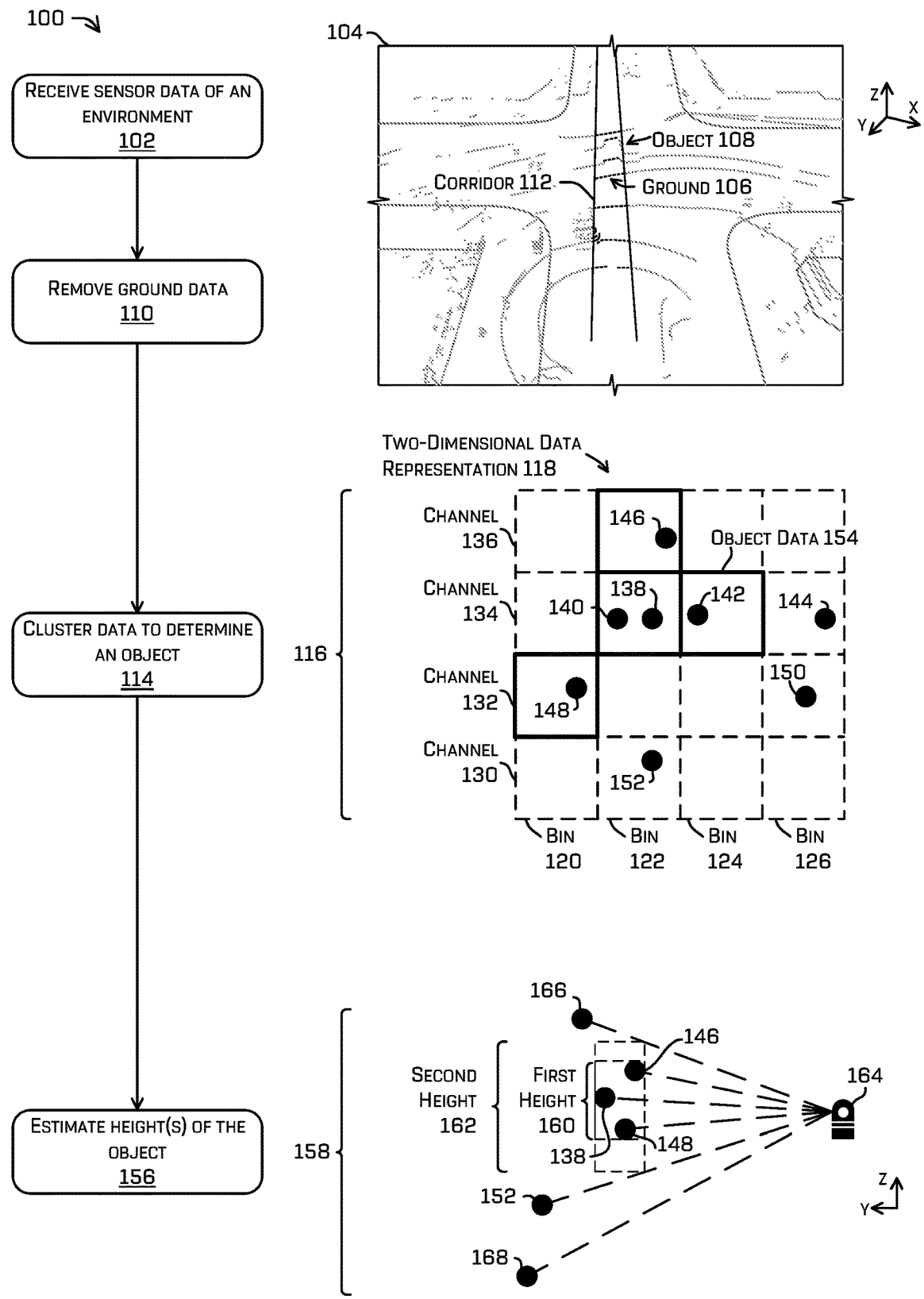
FIG. 1 is a pictorial flow diagram of an example process of estimating height(s) of an object.

Techniques for estimating a size of an object in an environment are discussed herein. For example, a sensor, such as a lidar sensor, can capture three-dimensional data of an environment. The three-dimensional sensor data can be associated with a two-dimensional data representation for further processing. For example, the lidar data may be associated with the two-dimensional data representation based on an azimuth bin and a beam index. A ground surface can be removed from the two-dimensional data representation, and clustering techniques can be used to cluster sensor data to determine object(s) represented in the sensor data. A first height of an object can be estimated or otherwise determined based on a vertical extent of the sensor data associated with the object. A second height of the object can be estimated or otherwise determined based on a first vertical distance from a top of the object to a ray associated with an upper lidar beam or a second vertical distance from a bottom of the object to a ray associated with lower lidar beam or the ground. Thus, a minimum and/or maximum height of an object can be determined in a robust manner.

In some examples, the techniques discussed herein may be implemented a vehicle comprising a primary system for controlling the vehicle and a secondary system that operates on the vehicle to validate operation of the primary system and to control the vehicle to avoid collisions. For example, the techniques may be implemented in the secondary system to detect objects in an environment and to validate that the system accurately detects objects of a minimum and/or maximum height.

The techniques discussed herein may include capturing or receiving sensor data of environment, such as lidar data from a lidar sensor. To reduce an amount of data for processing, the techniques can include receiving an indication of or otherwise determining a corridor associated with a drivable area and a ground surface represented in the corridor. Data outside the corridor or associated with the ground surface can be removed or discarded, thereby resulting in a dataset comprising non-ground lidar returns.

In some examples, lidar data can be associated with a two-dimensional data representation before or after removing a ground surface. The two-dimensional data representation (also referred to as a two-dimensional representation or a 2D space) may represent lidar data with a first dimension representing an azimuth bin and a second dimension representing beam index. For example, a rotating lidar may include scanning 360 degrees of an environment. The first dimension of the 2D space may be discretized into azimuth bins (also referred to as bins), which may comprise 5 degrees, 8 degrees, 10 degrees, 18 degrees, 36 degrees, and the like. The second dimension of the 2D space may be discretized into beam indices, such as 32, 64, 100, 128, etc. individual beam indices (also referred to as channels).

Data represented in the 2D space can be clustered to determine an object represented in the data. The techniques can include determining a non-ground data point closest to a location associated with the lidar sensor. That is, each data point can be associated with a distance or range between an object in the environment and a location (such as an origin) associated with the lidar sensor. In some examples, data in the 2D space (or within a beam index) can be ordered in a data structure by range for efficient data lookup.

In some examples, the clustering techniques can be applied within a beam index at a first time and then applied across beam indices at a second time after the first time, as discussed herein.

After determining the closest non-ground data point in the corridor (e.g., a first point), the techniques can include determining a distance to a next closest point in the 2D space (e.g., a second point). For example, the distance can be determined as a three-dimensional distance in the environment. If the distance is below a threshold, the first point and the second point can be clustered to represent a same object. The clustering can be repeated for each additional data point, with respect to the first point. Next, the clustering can be repeated for each additional data point, with respect to the second point. For example, a distance can be determined between the second point and a third point, and if that distance is below a threshold distance, the third point can be associated with the object. Data associated with a same object can be referred to as object data.

After clustering is performed on data within a same beam index, the techniques can be performed on other data in the 2D space. For example, the techniques can be performed with the same or different azimuth bins and/or across different beam indices. Additional aspects of clustering are discussed throughout this disclosure.

Techniques additionally include estimating or otherwise determining a height (and/or a height range) associated with the object data. In some examples, a first height (e.g., a lower bound of the height range) can be determined based on a vertical distance associated with the object data. For example, the vertical distance between beams can be based at least in part on the range between the object data and the location or origin associate with the lidar sensor. That is, a vertical spread of lidar beams may be a function of the distance between the object data and the lidar sensor. For example, at a first distance (e.g. 5 meters) the vertical distance between lidar beams may be a first vertical distance (e.g., 3 cm). At a second distance (e.g., 10 meters) the vertical distance between lidar beams may be a second vertical distance (e.g., 6 cm). Thus, a first height of the object can be determined based at least in part on the number of beams associated with the object. In some examples, the height of the object can be based on a three-dimensional distance determined based on the x-, y-, and z-coordinates of the data.

However, because a vertical resolution of the lidar sensor may be somewhat limited, the captured object data may not accurately represent the height of an object in an environment. Thus, the techniques can include estimating or otherwise determining a second height (e.g., an upper bound of the height range) based on a distance between the object data and a higher or lower beam of sensor data. For example, the second height of the object can be estimated or otherwise determined based on a first vertical distance from a top of the object to a ray associated with an upper lidar beam or a second vertical distance from a bottom of the object to a ray associated with lower lidar beam or the ground. Additional aspects of estimating or otherwise determining the height of an object are discussed throughout the disclosure.

In some examples, a perception system of the vehicle may filter objects based on an estimated size of the object. In some examples, a vehicle can be controlled based on a size of the object being above a threshold. For example, an object that is below a threshold may be filtered or ignored for planning purposes (or other operations). In another example, an object that is above the threshold may be considered for planning purposes (or other operations). Example operations to control the vehicle may include, but are not limited to, a safe stop, an emergency stop, determining a trajectory to avoid the object, determining a trajectory to avoid a predicted location of the object, and the like. Additional operations based on the height of the object may include classification operations, prediction operations, and the like.

The height estimation techniques described herein can improve a functioning of a computing device by providing a robust method of estimating or otherwise determining a height of an object in an environment. For example, height data can allow subsequent processes such as classification, tracking, prediction, route planning, trajectory generation, and the like to be performed more accurately, may require less processing power, and/or may require less memory. For example, in some instances, faster and/or more accurate segmentation (e.g., using the clustering techniques discussed herein) can be used in generating a trajectory of an autonomous vehicle, which can improve safety for occupants of an autonomous vehicle. In some examples, the techniques can be used in a secondary computing system of a primary/secondary computing system architecture, which allows for redundant systems to greatly improve overall reliability and safety outcomes. Further, the techniques discussed herein may be incorporated into a system that can be validated for safety. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques can be utilized in a manufacturing assembly line context, in an aerial surveying context, or in a nautical context. Additionally, the techniques described herein can be used with real data (e.g., captured using sensor(s)), simulated data (e.g., generated by a simulator), or any combination of the two.

FIG. 1 is a pictorial flow diagram of an example process 100 of estimating height(s) of an object.

An operation 102 can include receiving sensor data of an environment. For example, the operation 102 can include receiving lidar data representing an environment 104. The environment 104 may include a ground 106 and an object 108. In some example, the operation 102 can include receiving sensor data from a plurality of sensors (e.g., multiple lidar sensors) and fusing or otherwise combining the data into a single point cloud (e.g., a calibrated and aligned dataset). In some examples, the operation 102 can be performed by an autonomous vehicle as it traverses the environment 104.

An operation 110 can include removing ground data in the environment 104. For example, the ground data (e.g., representing the ground 106) can be removed to reduce an amount of data and/or to increase an accuracy of subsequent operations. Further, the operation 110 can include identifying a corridor 112 associated with a trajectory of an autonomous vehicle. For example, the operation 110 can determining the corridor based at least in part on a width and/or length of the vehicle, a current velocity of the vehicle and/or a velocity associated with the trajectory, and the like.

With respect to removing ground data, the operation 110 can include classifying a subset of sensor data (associated with the corridor) as belonging to either a ground classification or an object classification. The ground classification may identify sensor data as being associated with a roadway and/or other environmental surface, whereas the object classification may comprise any other object that is not ground. In some examples, the techniques discussed herein may simply classify sensor data as either ground or an object, without further identifying what type of object.

The operation 110 may include techniques that may improve (e.g., decrease) a false negative and/or false positive rate associated with classifying sensor data as ground or as an object. In some examples, the techniques may comprise estimating a line and/or plane to model a profile of a roadway surface (e.g., a roadway height profile), particularly for complex roadways that may comprise one or more changes in grade (e.g., slope of the roadway surface). These ground fitting techniques may comprise determining a spline (e.g., one or more polynomials, a Bezier curve) associated with the ground based at least in part on determining a number of control points and knots of the spline based at least in part on a number or percentage of sensor data that comprises a valid return. In some examples, when the sensor data is sparse for a portion of the environment, the determined spline may be inaccurate. The techniques may additionally or alternatively comprise weighting the sensor data before generating the spline (e.g., by weighting a least squares regression towards a lowest and/or highest (in elevation) sensor data point), altering a height value (e.g., ordinate) associated with one or more control points based at least in part on sensor data as a post-fitting operation, and/or altering a spacing of the knots as a post-fitting operation. In some examples, determining the spline may comprise determining values of the control points and/or knots based at least in part on a regression algorithm (e.g., least squares). Additional examples of identifying ground data can be found, for example, in U.S. patent application Ser. No. 16/588,717 titled "Complex Ground Profile Estimation" and filed Sep. 30, 2019, the entirety of which is herein incorporated by reference.

An operation 114 can include clustering data to determine an object. An example 116 illustrates clustering data represented in a two-dimensional data representation based on a distance between data points. For example, a two-dimensional data representation 118 can include a first dimension representing bins 120, 122, 124, and 126. Such bins 120-126 may represent azimuth bins as discussed herein. Further, the two-dimensional data representation 118 can include a second dimension representing channels 130, 132, 134, and 136. In some examples, the channels 130-136 can represent beam indices, as discussed herein. In some examples, a number of channels can be based at least in part on a number of beams or channels associated with a lidar sensor.

In some examples, the operations 102 or 114 can include associating the sensor data with the two-dimensional data representation 118. For example, the operations can include associating three-dimensional data with the two-dimensional data representation 118.

As illustrated, the two-dimensional data representation 118 comprises data points 138, 140, 142, 144, 146, 148, 150, and 152.

The clustering operations (e.g., the operation 114) can be used to determine object data 154, representing the data points 138, 140, 142, 146, and 148. The object data 154 can represent the object 108 in the environment 104. In general, clustering can be based at least in part on a distance between data points in the two-dimensional data representation 118. For example, the data points 138 and 140 are included in the object data 154, as a distance between the data points 138 and 140 is below a threshold distance. Further, the data point 144 is not included as the object data 154 as a distance between the data point 142 (a data point associated with the object data 154) and the data point 144 is above a threshold distance. Additional details of clustering data are discussed in connection with FIG. 2, as well as throughout this disclosure.

An operation 156 can include estimating (or otherwise determining) height(s) of the object. An example 158 illustrates determining a first height 160 associated with the object data 154 and a second height 162 associated with the object data 154. The example 158 represents a side profile of the data represented in the example 116 to better illustrate range or depth information between lidar data captured by a lidar sensor 164. The example 158 includes additional data points 166 and 168 (for illustrating various data operations, as discussed herein).

The first height 160 can be determined based on a vertical extent of data associated with the object data 154. For example, the first height can be determined based on a vertical height associated with the data points 138, 146, and 148. In some example, the first height can be based at least in part on some (e.g., the lowest data point 148 and the highest data point 146) or all of the data points (e.g., data points 138, 140, 142, 146, and 148).

The second height 162 can be estimated or otherwise determined based on a first vertical distance from a top of the object (e.g., represented by the data point 146) to a ray associated with an upper lidar beam associated with a data point (e.g., the data point 166) or a second vertical distance from a bottom of the object (e.g., represented by the data point 148) to a ray associated with lower lidar beam associated with a data point (e.g., the data point 152) or the ground.

In some examples, a first height and/or a second height can be determined for each bin associated with an object, while in some cases a first height and/or a second height can be determined for the object as a whole. That is, a first and second height can be determined for the object data associated with the bin 120, a first and second height can be determined for the object data associated with the bin 122, and a first and second height can be determined for the object data associated with the bin 124. In some cases, the first and second height can be determined for the object data 154 as a whole (e.g., based on all the data points 138, 140, 142, 146, and 148 or based on the lowest and highest data points associated with the object data (e.g., the data points 148 and 146, respectively)).

Additional aspects of determining a height and/or a height range associated with the object data 154 are discussed in FIGS. 3A-3D, as well as throughout this disclosure.

Figure 2:
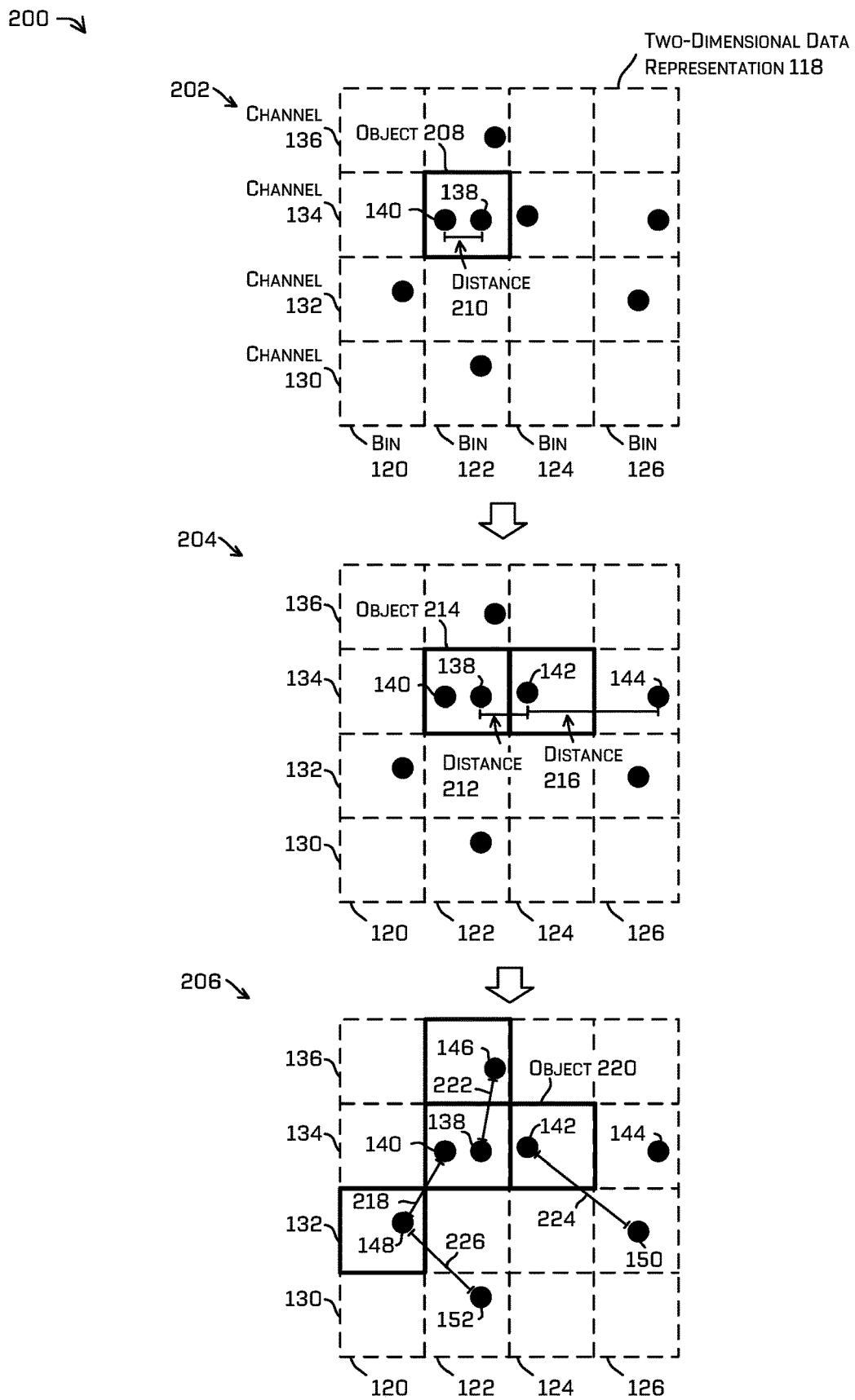
FIG. 2 is an illustration of an exemplary process for clustering data to determine object data.

FIG. 2 is an illustration an exemplary process 200 for clustering data to determine object data. The process 200 includes examples 202, 204, and 206 illustrating various states of processing.

The example 202 illustrates sensor data represented in the two-dimensional data representation 118. In some example, the clustering techniques can include determining a data point closest to a location associated with a sensor capturing the data. For example, the data point 138 represents the closest lidar data point to the lidar sensor capturing the data point 138 (e.g., the lidar sensor 164). In some examples, determining that the data point 138 is the closest point comprises associating the data point with an object 208. In some examples, the two-dimensional data representation 118 may sort data values by range, in which case selecting the closest data point to the lidar sensor may comprise accessing the first data value in an array of data values.

In some examples, if a region (also referred to as a data cell or cell) of the two-dimensional data representation is determined to be associated with an object (e.g., the object 208), all of the data points associated with that region can be associated with the object 208. In this case, as the region associated with the bin 122 and the channel 134 comprises the data points 138 and 140, both data points may be associated with the object 208.

In some examples, data points within a data cell can be clustered based on a distance to an anchor point or an initial point (e.g., the data point 138). For example, a distance 210 can be determined between the data point 138 and the data point 140. If the distance 210 is below a threshold distance, the data point 140 may be associated with the object 208. In the example 202, the thick black line associated with the data cell associated with the bin 122 and the channel 134 indicates the data cell is associated with the object 208.

The example 204 illustrates operations performed on data points within the channel 134. For example, the clustering can include determining a distance 212 between the data point 138 and the data point 142. As the distance 212 is below a distance threshold in this example, the data point 142 may be associated with the object 214. As noted above, in some examples, if a single data point in a data cell is associated with an object, some or all of the data points associated with the data cell may be associated with the same object.

Next, a distance 216 can be determined between the data point 142 and the data point 144. In this example, the distance 216 is above the threshold distance and therefore the data point 144 is not associated with the object 214.

As discussed herein, the distances 212, 216, etc. can be determined as Euclidian distances based on a three-dimensional location of the data points in an environment. In some examples, distances associated with individual directions can be considered. For example, an x-distance between data points can be considered with respect to a first distance threshold, a y-distance between data point can be considered with respect to a distance threshold, and a z-distance between data point can be considered with respect to a distance threshold.

In some examples, the operations can include determining distances between some or all data point pairs, and is not limited to the distances expressly illustrated in FIG. 2. For example, the operations can include determining a distance between the data point 138 and the data point 144 and evaluating the distance with respect to a threshold.

The example 206 illustrates additional operations based on data associated with the remaining channels 130, 132, and 136. For example, a distance 218 can be determined between the data point 140 and the data point 148. In this example, the distance 218 is below a threshold distance and therefore the data point 148 may be associated with an object 220. Similarly, a distance 222 between the data points 138 and 146 may be below the threshold distance, and therefore the data point 146 (and/or the data cell associated with the data point 146) may be associated with the object 220.

A distance 224 between the data point 142 and the data point 150 meets or exceeds the distance threshold and therefore the data point 150 is not associated with the object 220, in this example. Similarly, a distance 226 between the data point 148 and the data point 152 meets or exceeds the distance threshold and therefore the data point 152 is not associated with the object 220, in this example.

In some examples, the distances 210, 212, 216, 218, 222, 224, and/or 226 can be determined based on the three-dimensional positions of the data (e.g., based on x-, y-, and z-coordinates) associated with the two-dimensional data representation 118.

In some examples, operations can include verifying that the object data 154 corresponds to a minimum width and/or a minimum height (and/or that that the object data spans a threshold number of bins or channels). In some examples, if a dimension of the object data is below a threshold the object data can be filtered or otherwise ignored and the techniques can be repeated on the remaining subset of data. In some instances, the filtered object data can be rejoined with another object data based on subsequent clustering operations.

In some examples, after an object (e.g., the object 220) is determined based on an initial point (e.g., the data point 138), the process 200 can be repeated based on the remaining data points in the two-dimensional data representation 118. That is, a new initial point can be selected or determined from the remaining data points (e.g., the data points not associated with the object 220) and the process can be repeated to determine any additional objects in the two-dimensional data representation 118.

FIGS. 3A-3D illustrate various scenarios for estimating height(s) associated with sensor data.

Figure 3A:
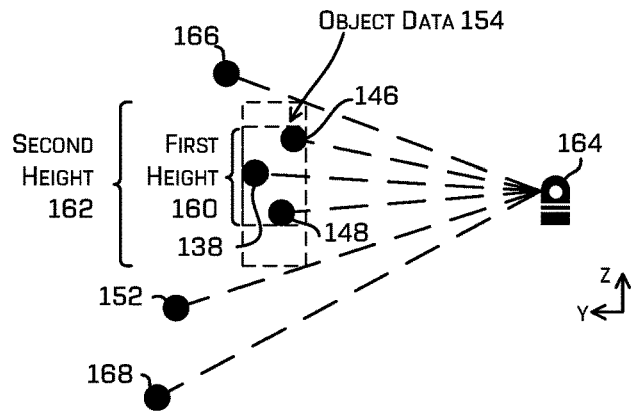
FIGS. 3A-3D illustrate various scenarios for estimating height(s) associated with sensor data.

FIG. 3A illustrates an example 300 similar to the scenario discussed above with respect to the example 158 of FIG. 1.

The example 300 illustrates determining the first height 160 and the second height 162 based at least in part on the data points 138, 146, and 148 representing the object data 154. The example 158 represents a side profile of the data represented in the examples 116 and 206 to better illustrate range or depth information between lidar data captured by a lidar sensor 164. The example 300 includes additional data points 166 and 168 (for illustrating various data operations, as discussed herein).

The first height 160 can be determined based on a vertical extent of the data points 138, 146, and 148. In some examples, the first height can be based at least in part on some (e.g., the lowest data point 148 and the highest data point 146) or all of the data points (e.g., data points 138, 140, 142, 146, and 148) associated with the object data 154.

The second height 162 can be estimated or otherwise determined based on a first vertical distance from a top of the object (e.g., represented by the data point 146) to a ray associated with an upper lidar beam associated with a data point (e.g., the data point 166) or a second vertical distance from a bottom of the object (e.g., represented by the data point 148) to a ray associated with lower lidar beam associated with a data point (e.g., the data point 152) or the ground.

Figure 3B:
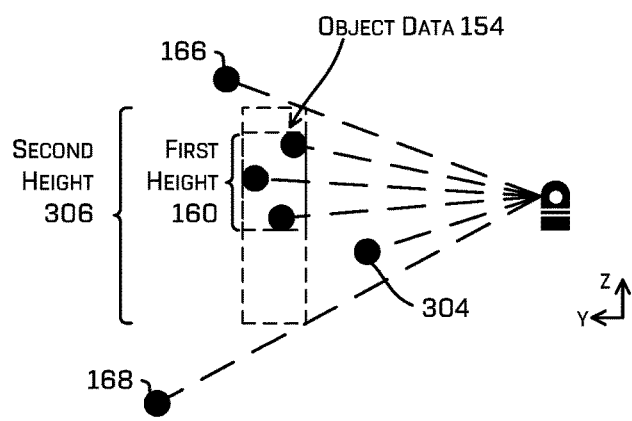

FIG. 3B illustrates an example 302 of a second scenario for estimating height(s) associated with the data points representing the object data 154.

The first height 160 may be determined in the same manner as discussed above in the example 300.

The example 302 includes a data point 304 rather than the data point 152. In this example 302, because a range associated with the data point 304 is less than the range associated with some or all of the object data 154, the data point 304 (and a ray associated with the data point 304) may not be used to estimate a second height associated with the object data 154. In some examples, additional channels can be iteratively processed to determine a lowest channel in which data exists with a range further than a range associated with the object data. In this example 302, a second height 306 is based at least in part on a ray associated with the data point 168. That is, the operations to determine a second height (e.g., an estimate of a maximum height) may include determining whether a range associated with a data point is above the range associated with the object data 154.

Figure 3C:
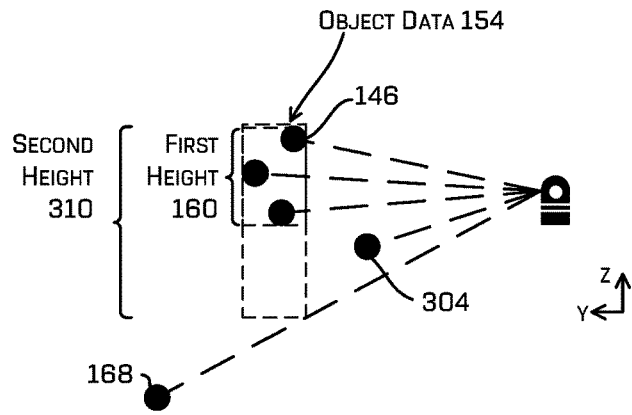

FIG. 3C illustrates an example 308 of a third scenario for estimating height(s) associated with the data points representing the object data 154.

The first height 160 may be determined in the same manner as discussed above in the example 300.

The example 308 omits the data point 166 (relative to the data points illustrated in the example 302). In this example 308, an upper bound associated with a second height 310 is determined based at least in part on the data point 146 of the object data 154, which represents a highest point associated with the object data 154. In some examples, depending on an implementation, the second height determined in example 308 can be the same as the second height 306. That is, the second height 310 can be based at least in part on the vertical distance between the top of the object data 154 and a next lidar beam regardless of whether a data point is associated with the lidar beam.

Figure 3D:
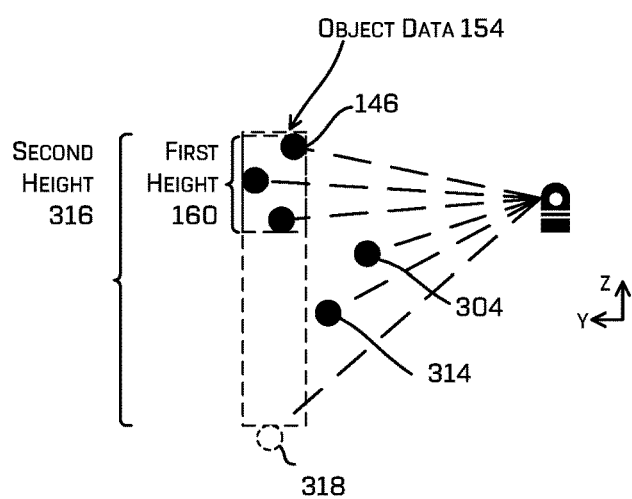

FIG. 3D illustrates an example 312 of a fourth scenario for estimating height(s) associated with the data points representing the object data 154.

The first height 160 may be determined in the same manner as discussed above in the example 300.

The example 312 includes a data point 314 rather than the data point 168 (relative to the data points illustrated in the example 308). In this example 312, because a range associated with the data points 304 and 314 are less than the range associated with some or all of the object data 154, the data points 304 and 314 (and rays associated with the data points 304 and 314) may not be used to estimate a second height associated with the object data 154. However, in this example 312, no non-ground data points are represented below the object data 154 (where the range is farther than the object data 154). Accordingly, a second height 316 can be determined based at least in part on a known height above a data point 318 representing a ground surface.

As can be understood, techniques from the examples 300, 302, 308, and/or 312 can be used in any combination to determine first and/or second heights associated with objects in an environment, based on a configuration of data presented.

Figure 4:
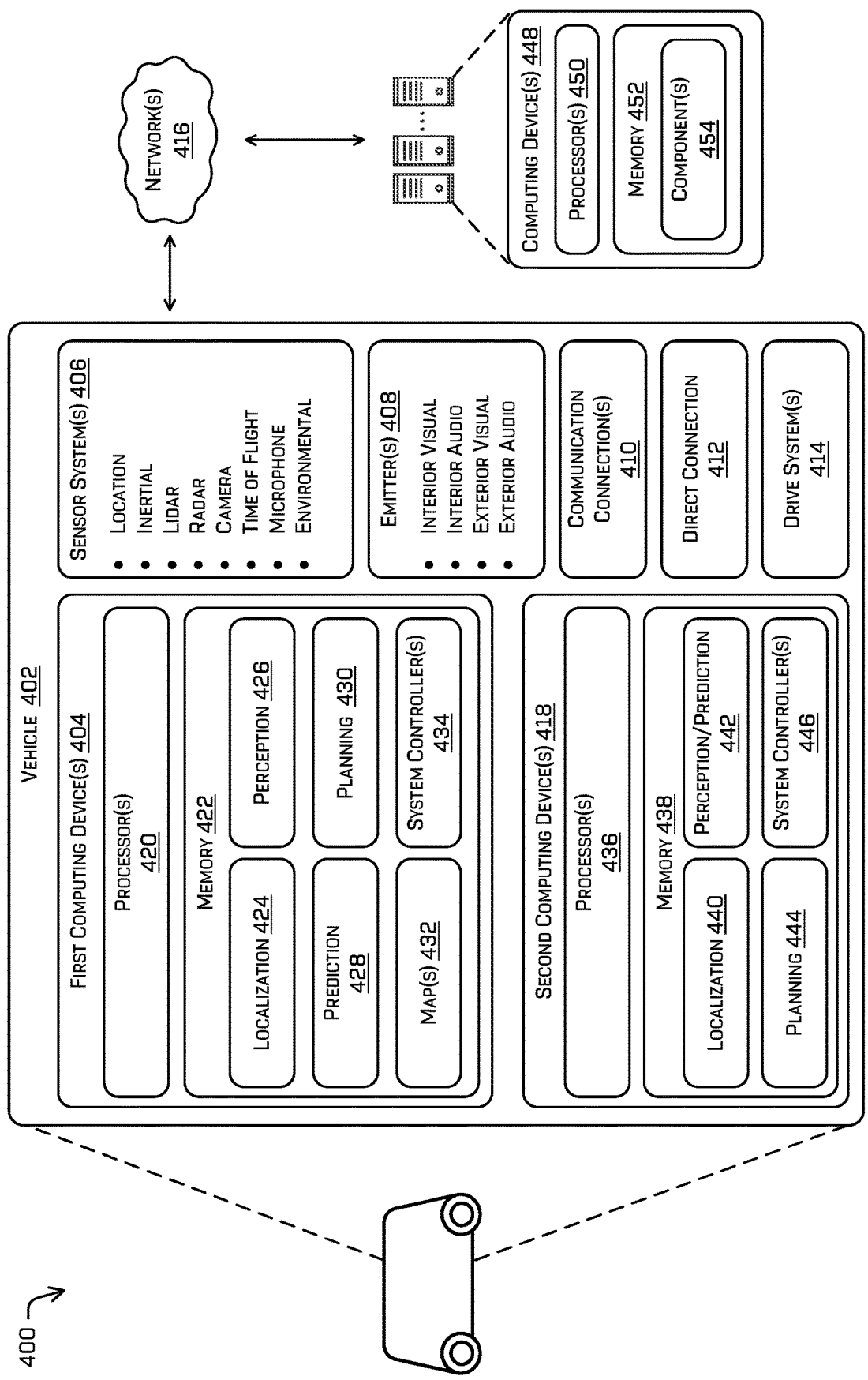
FIG. 4 is a block diagram of an example system for implementing the techniques described herein.

FIG. 4 is a block diagram of an example system 400 for implementing the techniques described herein. In at least one example, the system 400 can include a vehicle 402. In the illustrated example system 400, the vehicle 402 is an autonomous vehicle; however, the vehicle 402 can be any other type of vehicle.

The vehicle 402 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 402 can be configured to control all functions from start to completion of the trip, including all parking functions, it may not include a driver and/or controls for driving the vehicle 402, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 402 can include one or more first computing devices 404, one or more sensor systems 406, one or more emitters 408, one or more communication connections 410 (also referred to as communication devices and/or modems), at least one direct connection 412 (e.g., for physically coupling with the vehicle 402 to exchange data and/or to provide power), and one or more drive systems 414. The one or more sensor systems 406 can be configured to capture sensor data associated with an environment.

The sensor system(s) 406 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 406 can include multiple instances of each of these or other types of sensors. For instance, the time-of-flight sensors can include individual time-of-flight sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the first computing device(s) 404.

The vehicle 402 can also include emitter(s) 408 for emitting light and/or sound. The emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 can also include communication connection(s) 410 that enable communication between the vehicle 402 and one or more other local or remote computing device(s) (e.g., a remote teleoperation computing device) or remote services. For instance, the communication connection(s) 410 can facilitate communication with other local computing device(s) on the vehicle 402 and/or the drive system(s) 414. Also, the communication connection(s) 410 can allow the vehicle 402 to communicate with other nearby computing device(s) (e.g., other nearby vehicles, traffic signals, etc.).

The communications connection(s) 410 can include physical and/or logical interfaces for connecting the first computing device(s) 404 to another computing device or one or more external networks 416 (e.g., the Internet). For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 402 can include drive system(s) 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include the sensor system(s) 406 to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) 406 on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) 406 and to control operation of the various vehicle systems. In some examples, the drive system controller can include one or more processor(s) and memory communicatively coupled with the one or more processor(s). The memory can store one or more components to perform various functionalities of the drive system(s) 414. Furthermore, the drive system(s) 414 also include one or more communication connection(s) that enable communication by the respective drive system with one or more other local or remote computing device(s).

The vehicle 402 can include one or more second computing devices 418 to provide redundancy, error checking, and/or validation of determinations and/or commands determined by the first computing device(s) 404.

By way of example, the first computing device(s) 404 may be considered to be a primary system, while the second computing device(s) 418 may be considered to be a secondary system. The primary system may generally perform processing to control how the vehicle maneuvers within an environment. The primary system may implement various Artificial Intelligence (AI) techniques, such as machine learning, to understand an environment around the vehicle and/or instruct the vehicle to move within the environment. For example, the primary system may implement the AI techniques to localize the vehicle, detect an object around the vehicle, segment sensor data, determine a classification of the object, predict an object track, generate a trajectory for the vehicle, and so on. In examples, the primary system processes data from multiple types of sensors on the vehicle, such as light detection and ranging (lidar) sensors, radar sensors, image sensors, depth sensors (time of flight, structured light, etc.), and the like.

The secondary system may validate an operation of the primary system and may take over control of the vehicle from the primary system when there is a problem with the primary system. The secondary system may implement probabilistic techniques that are based on positioning, velocity, acceleration, etc. of the vehicle and/or objects around the vehicle. For example, the secondary system may implement one or more probabilistic techniques to independently localize the vehicle (e.g., to a local environment), detect an object around the vehicle, segment sensor data, identify a classification of the object, predict an object track, generate a trajectory for the vehicle, and so on. In examples, the secondary system processes data from a few sensors, such as a subset of sensor data that is processed by the primary system. To illustrate, the primary system may process lidar data, radar data, image data, depth data, etc., while the secondary system may process just lidar data and/or radar data (and/or time of flight data). In other examples, however, the secondary system may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference.

The first computing device(s) 404 can include one or more processors 420 and memory 422 communicatively coupled with the one or more processors 420. In the illustrated example, the memory 422 of the first computing device(s) 404 stores a localization component 424, a perception component 426, a prediction component 428, a planning component 430, a maps component 432, and one or more system controllers 434. Though depicted as residing in the memory 422 for illustrative purposes, it is contemplated that the localization component 424, the perception component 426, the prediction component 428, the planning component 430, the maps component 432, and the one or more system controllers 434 can additionally, or alternatively, be accessible to the first computing device(s) 404 (e.g., stored in a different component of vehicle 402 and/or be accessible to the vehicle 402 (e.g., stored remotely).

In memory 422 of the first computing device 404, the localization component 424 can include functionality to receive data from the sensor system(s) 406 to determine a position of the vehicle 402. For example, the localization component 424 can include and/or request/receive a three-dimensional map of an environment and can continuously determine a location of the autonomous vehicle within the map. In some instances, the localization component 424 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 424 can provide data to various components of the vehicle 402 to determine an initial position of an autonomous vehicle for generating a trajectory, as discussed herein.

The perception component 426 can include functionality to perform object detection, segmentation, and/or classification. In some examples, the perception component 426 can provide processed sensor data that indicates a presence of an entity that is proximate to the vehicle 402 and/or a classification of the entity as an entity type (e.g., car, pedestrian, cyclist, building, tree, road surface, curb, sidewalk, unknown, etc.). In additional or alternative examples, the perception component 426 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 426 can use perception algorithms to determine a perception-based bounding box associated with an object in the environment based on sensor data. For example, the perception component 426 can receive image data and classify the image data to determine that an object is represented in the image data. Then, using detection algorithms, the perception component 426 can generate a two-dimensional bounding box and/or a perception-based three-dimensional bounding box associated with the object. The perception component 426 can further generate a three-dimensional bounding box associated with the object. As discussed above, the three-dimensional bounding box can provide additional information such as a location, orientation, pose, and/or size (e.g., length, width, height, etc.) associated with the object.

The perception component 426 can include functionality to store perception data generated by the perception component 426. In some instances, the perception component 426 can determine a track corresponding to an object that has been classified as an object type. For purposes of illustration only, the perception component 426, using sensor system(s) 406 can capture one or more images of an environment. The sensor system(s) 406 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle 402. Fused perception data can include a fusion or other combination of sensor data from sensor system(s) 406, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 428 can generate one or more probability maps representing prediction probabilities of possible locations of one or more objects in an environment. For example, the prediction component 428 can generate one or more probability maps for vehicles, pedestrians, animals, and the like within a threshold distance from the vehicle 402. In some instances, the prediction component 428 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 430 can determine a path for the vehicle 402 to follow to traverse through an environment. For example, the planning component 430 can determine various routes and paths and various levels of detail. In some instances, the planning component 430 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 430 can generate an instruction for guiding the autonomous vehicle along at least a portion of the route from the first location to the second location. In at least one example, the planning component 430 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 430 can alternatively, or additionally, use data from the perception component 426 and/or the prediction component 428 to determine a path for the vehicle 402 to follow to traverse through an environment. For example, the planning component 430 can receive data from the perception component 426 and/or the prediction component 428 regarding objects associated with an environment. Using this data, the planning component 430 can determine a route to travel from a first location (e.g., a current location) to a second location (e.g., a target location) to avoid objects in an environment. In at least some examples, such a planning component 430 may determine there is no such collision free path and, in turn, provide a path which brings vehicle 402 to a safe stop avoiding all collisions and/or otherwise mitigating damage.

The memory 422 can further include one or more maps 432 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 432 can include at least one map (e.g., images and/or a mesh). In some examples, the vehicle 402 can be controlled based at least in part on the map(s) 432. That is, the map(s) 432 can be used in connection with the localization component 424, the perception component 426, the prediction component 428, and/or the planning component 430 to determine a location of the vehicle 402, identify objects in an environment, generate prediction probabilit(ies) associated with objects and/or the vehicle 402, and/or generate routes and/or trajectories to navigate within an environment.

In some examples, the one or more maps 432 can be stored on a remote computing device(s) (such as the computing device(s) 448) accessible via network(s) 416. In some examples, multiple maps 432 can be stored based on, for example, a characteristic (e.g., type of entity, time of day, day of week, season of the year, etc.). Storing multiple maps 432 can have similar memory requirements but can increase the speed at which data in a map can be accessed.

In at least one example, the first computing device(s) 404 can include one or more system controller(s) 434, which can be configured to control steering, propulsion, braking, safety, emitters, communication, and other systems of the vehicle 402. These system controller(s) 434 can communicate with and/or control corresponding systems of the drive system(s) 414 and/or other components of the vehicle 402, which may be configured to operate in accordance with a path provided from the planning component 430.

The second computing device(s) 418 can comprise one or more processors 436 and memory 438 including components to verify and/or control aspects of the vehicle 402, as discussed herein. In at least one instance, the one or more processors 436 can be similar to the processor(s) 420 and the memory 438 can be similar to the memory 422. However, in some examples, the processor(s) 436 and the memory 438 may comprise different hardware than the processor(s) 420 and the memory 422 for additional redundancy.

In some examples, the memory 438 can comprise a localization component 440, a perception / prediction component 442, a planning component 444, and one or more system controllers 446.

In some examples, the localization component 440 may receive sensor data from the sensor(s) 406 to determine one or more of a position and/or orientation (together a pose) of the autonomous vehicle 402. Here, the position and/or orientation may be relative to point(s) and/or object(s) in an environment in which the autonomous vehicle 402 is located. In examples, the orientation may include an indication of a yaw, roll, and/or pitch of the autonomous vehicle 402 relative to a reference plane and/or relative to point(s) and/or object(s). In examples, the localization component 440 may perform less processing than the localization component 424 of the first computing device(s) 404 (e.g., higher-level localization). For instance, the localization component 440 may not determine a pose of the autonomous vehicle 402 relative to a map, but merely determine a pose of the autonomous vehicle 402 relative to objects and/or surfaces that are detected around the autonomous vehicle 402 (e.g., a local position and not a global position). Such a position and/or orientation may be determined, for example, using probabilistic filtering techniques, such as, for example, Bayesian filters (Kalman filters, extended Kalman filters, unscented Kalman filters, etc.) using some or all of the sensor data.

In some examples, the perception / prediction component 442 can include functionality to detect, identify, classify, and/or track object(s) represented in sensor data. For example, the perception / prediction component 442 can perform the clustering operations and operations to estimate or determine a height associated with objects, as discussed herein.

In some examples, the perception / prediction component 442 may comprise an M-estimator, but may lack an object classifier such as, for example, a neural network, decision tree, and/or the like for classifying objects. In additional or alternate examples, the perception / prediction component 442 may comprise an ML model of any type, configured to disambiguate classifications of objects. By contrast, the perception component 426 may comprise a pipeline of hardware and/or software components, which may comprise one or more machine-learning models, Bayesian filters (e.g., Kalman filters), graphics processing unit(s) (GPU(s)), and/or the like. In some examples, the perception data determined by the perception / prediction component 442 (and/or 426) may comprise object detections (e.g., identifications of sensor data associated with objects in an environment surrounding the autonomous vehicle), object classifications (e.g., identifications of an object type associated with detected objects), object tracks (e.g., historical, current, and/or predicted object position, velocity, acceleration, and/or heading), and/or the like.

The perception/prediction component 442 may also process the input data to determine one or more predicted trajectories for an object. For example, based on a current position of an object and a velocity of the object over a period of a few seconds, the perception/prediction component 442 may predict a path that the object will move over the next few seconds. In some examples, such a predicted path may comprise using linear assumptions of motion given a position, orientation, velocity, and/or orientation. In other examples, such predicted paths may comprise more complex analyses.

In some examples, the planning component 444 can include functionality to receive a trajectory from the planning component 430 to validate that the trajectory is free of collisions and/or is within safety margins. In some examples, the planning component 444 can generate a safe stop trajectory (e.g., a trajectory to stop the vehicle 402 with a "comfortable" deacceleration (e.g., less than maximum deceleration)) and in some examples the planning component 444 can generate an emergency stop trajectory (e.g., maximum deceleration with or without steering inputs).

In some examples, the system controller(s) 446 can include functionality to control safety critical components (e.g., steering, braking, motors, etc.) of the vehicle. In this manner, the second computing device(s) 418 can provide redundancy and/or an additional hardware and software layer for vehicle safety.

The vehicle 402 can connect to computing device(s) 448 via the network 416 and can include one or more processors 450 and memory 452 communicatively coupled with the one or more processors 450. In at least one instance, the one or more processors 450 can be similar to the processor(s) 420 and the memory 452 can be similar to the memory 422. In the illustrated example, the memory 452 of the computing device(s) 448 stores a component(s) 454, which may correspond to any of the components discussed herein.

The processor(s) 420, 436, and/or 450 can be any suitable processor capable of executing instructions to process data and perform operations as described herein. By way of example and not limitation, the processor(s) 420, 436, and/or 450 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 422, 438, and/or 452 are examples of non-transitory computer-readable media. The memory 422, 438, and/or 452 can store an operating system and one or more software applications, instructions, programs, and/or data to implement the methods described herein and the functions attributed to the various systems. In various implementations, the memory 422, 438, and/or 452 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 422, 438, and/or 452 can be implemented as a neural network. In some examples, the components in the memory 422, 438, and/or 452 may not include machine learning algorithm to reduce complexity and to be verified and/or certified from a safety standpoint.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Accordingly, the techniques discussed herein provide a robust implementation of determining height data of objects in an environment to allow the safe operation of a vehicle, such as an autonomous vehicle.

Figure 5:
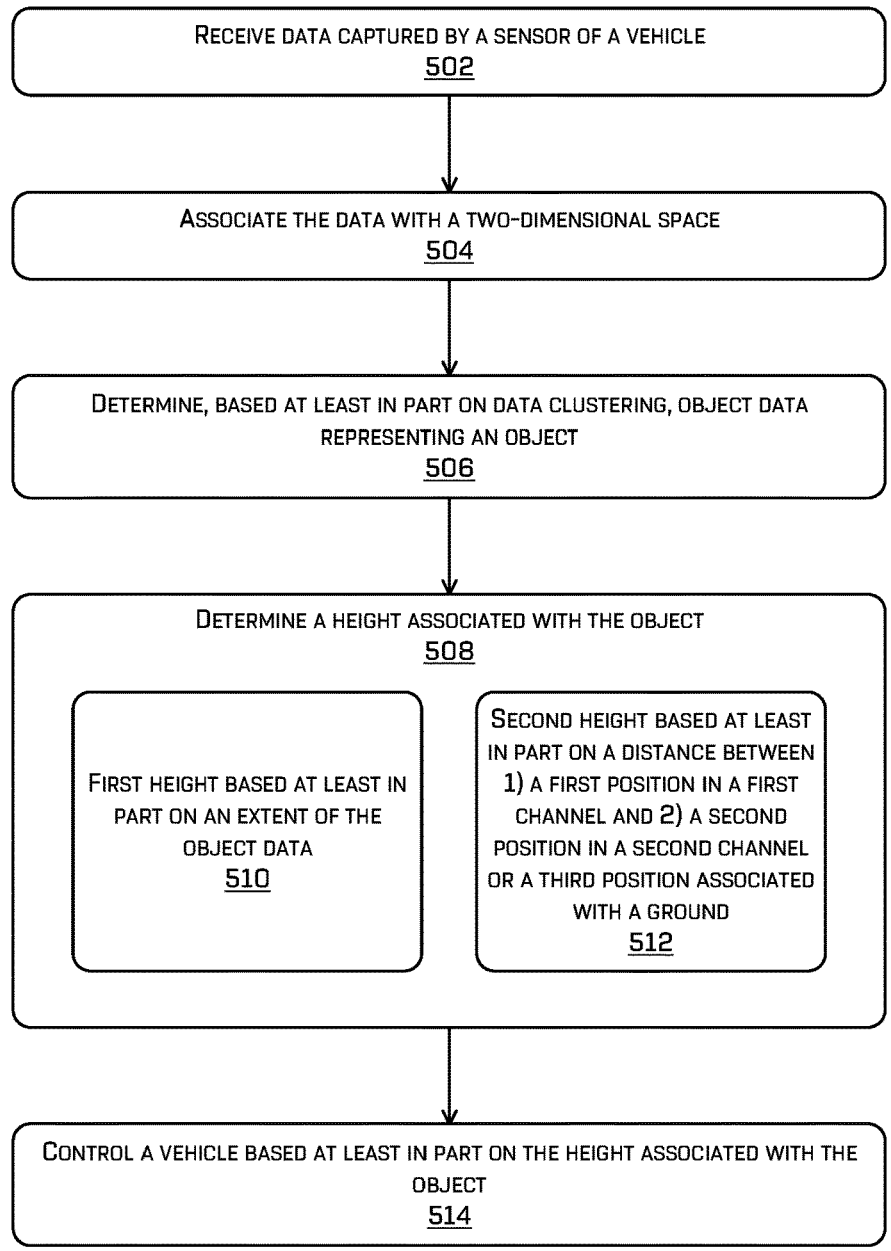
FIG. 5 is an example process for estimating height(s) associated with objects based on sensor data.
Figure 6:
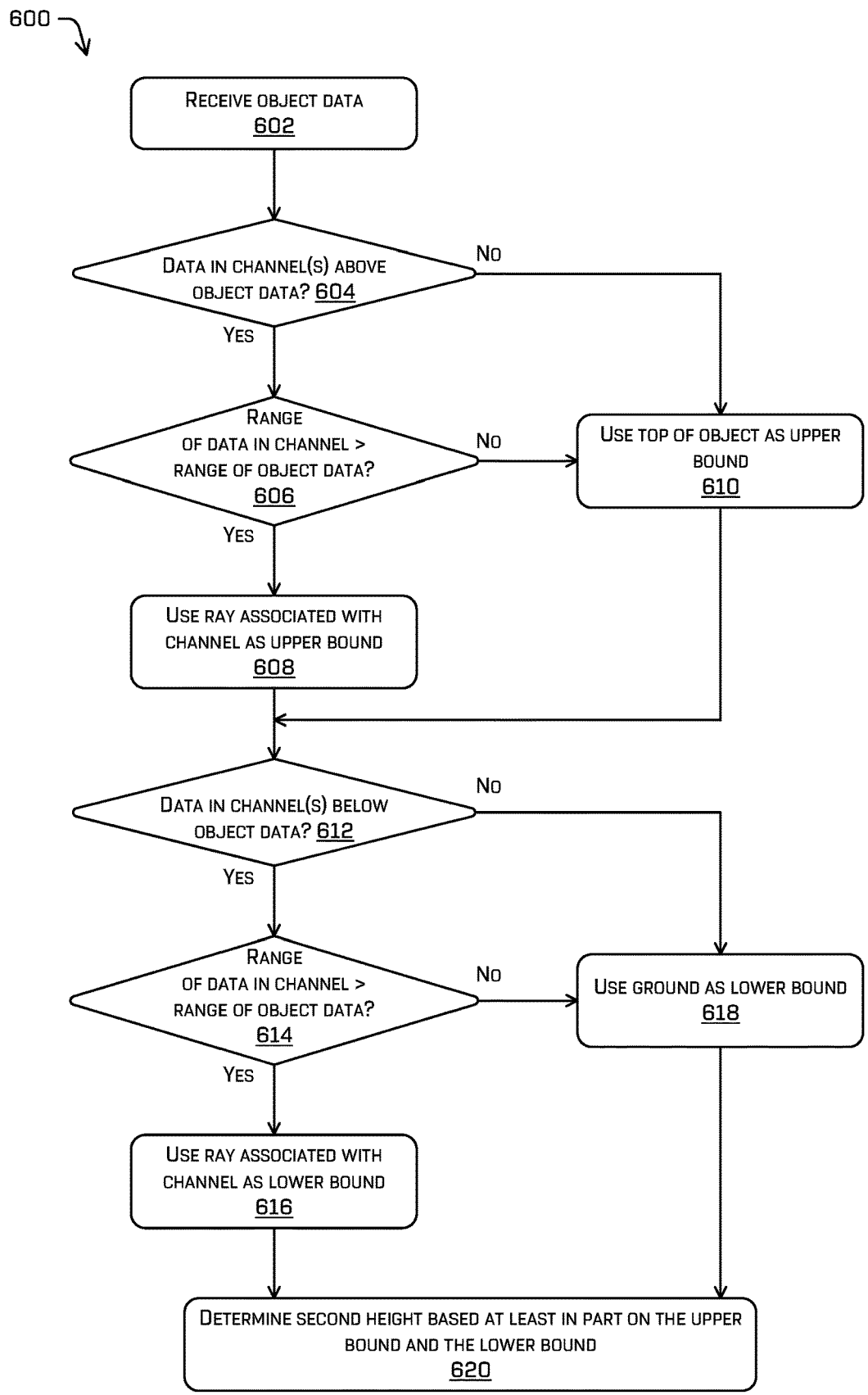
FIG. 6 is an example process for determining a height of an object based on an upper bound and a lower bound associated with object data.

FIGS. 5 and 6 illustrates example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 is an example process 500 for estimating height(s) associated with objects based on sensor data. For example, some or all of the process 500 can be performed by one or more components in FIG. 4, as described herein. For example, some or all of the process 500 can be performed by the second computing device(s) 418.

At operation 502, the process can include receiving data captured by a sensor of a vehicle. In some examples, the operation 502 can include receiving or capturing lidar data from one or more lidar sensors of an autonomous vehicle as the autonomous vehicle traverses an environment.

At operation 504, the process can include associating the data with a two-dimensional space. For example, the operation 504 can include associating three-dimensional data with a two-dimensional data representation. The two-dimensional data representation can include a first dimension representing an azimuth bin, while a second dimension can represent a lidar beam or channel. In some examples, the operation 504 can include filtering the data to remove data associated with a ground and/or to remove data outside of a corridor associated with a trajectory for the autonomous vehicle to follow.

At operation 506, the process can include determining, based at least in part on data clustering, object data representing an object. As discussed herein, data clustering can be based at least in part on determining that a distance between points is below a threshold distance. Additional aspects of data clustering are discussed in FIGS. 1 and 2, as well as throughout the disclosure.

At operation 508, the process can include determining a height associated with the object. As discussed herein, the operation 508 can include determining a first height and a second height associated with the object, which in some instances can represent a minimum height (or lower bound) associated with an object and a maximum height (or upper bound) associated with an object, as discussed herein.

At operation 510, the process can include determining a first height based at least in part on an extent of the object data. For example, the first height can be based at least in part on a vertical distance associated with the object data. Additional aspects of determining the first height are discussed in FIGS. 1 and 3A-3D, as well as throughout the disclosure.

At operation 512, the process can include determining a second height based at least in part on a distance between 1) a first portion in a first channel and 2) a second position in a second channel or a third position associated with a ground. Additional aspects of determining the second height are discussed in FIGS. 1, 3A-3D, and 6, as well as throughout the disclosure.

At operation 514, the process can include controlling a vehicle based at least in part on the height associated with the object. In some examples, controlling the vehicle can include generating a trajectory, executing a safe stop trajectory, executing an emergency stop trajectory, and the like. In some instances, the operation can include determining whether the height meets or exceeds a threshold height for subsequent classification, filtering, and the like.

FIG. 6 is an example process 600 for determining a height of an object based on an upper bound and a lower bound associated with object data. For example, some or all of the process 600 can be performed by one or more components in FIG. 4, as described herein. For example, some or all of the process 600 can be performed by the second computing device(s) 418.

In some examples, the process 600 can represent operations performed in operation 512 of FIG. 5.

In general, operations 604, 606, 608, and 610 can correspond to estimating or otherwise determining an upper bound (or upper extent) associated with a height of an object, while operations 612, 614, 616, and 618 can correspond to estimating or otherwise determining a lower bound (or lower extent) associated with a height of the object.

At operation 602, the process can include receiving object data. For example, the object data can be received having been associated with a two-dimensional data representation and/or clustered based on the techniques discussed herein.

At operation 604, the process can include determining whether data exists above the object data. For example, the data in any channels above the object data may correspond to another object (e.g., the data may be associated with a second object that is different that the object data. If data is in channel(s) above the object data, the process continues to operation 606. In some examples, the operation 604 can be limited to data in same bin(s) above the object data. That is, if object data is not associated with a bin, the operation 604 may not consider such data in the operation 604.

At operation 606, the process can include determining whether the range of data in a channel (e.g., above the object data) is greater than a range associated with the object data. If a range of data in a channel is greater than a range associated with the object data, the process continues to operation 608, which may include using a ray associated with a channel as an upper bound for a height of the object. In some examples, the operation 608 can include determining a vertical distance between the object data (e.g., a highest point associated with the object data) and a ray associated with the data above the object data and a location associated with a lidar sensor.

If there is no data in channel(s) above the object (e.g., "no" in operation 604) or a range of data in a channel above the object data is less than the range of object data (e.g., "no" in operation 606), the process continues to operation 610.

At operation 610, the process can include using the top of the object as an upper bound (or upper extent) for a height of the object. In some examples, the operation 610 can include using a location associated with the top of the object as an upper bound (or upper extent) for a height of the object, wherein the location may be based at least in part on a channel directly above the top of the object.

At operation 612, the process can include determining whether data exists below the object data. For example, the data in any channels below the object data may correspond to another object (e.g., the data may be associated with a second object that is different that the object data. If data is in channel(s) below the object data, the process continues to operation 614. In some examples, the operation 612 can be limited to data in same bin(s) below the object data. That is, if object data is not associated with a bin, the operation 612 may not consider such data in the operation 612.

At operation 614, the process can include determining whether the range of data in a channel (e.g., below the object data) is greater than a range associated with the object data.

If a range of data in a channel is greater than a range associated with the object data, the process continues to operation 616, which may include using a ray associated with a channel as a lower bound for a height of the object. In some examples, the operation 616 can include determining a vertical distance between the object data (e.g., a lowest point associated with the object data) and a ray associated with the data below the object data and a location associated with a lidar sensor.

If there is no data in channel(s) below the object (e.g., "no" in operation 612) or a range of data in a channel below the object data is less than the range of object data (e.g., "no" in operation 614), the process continues to operation 618.

At operation 618, the process can include using the ground as a lower bound (or lower extent) for a height of the object.

At operation 620, the process can include determining a second height based at least in part on the upper bound and the lower bound, as determined in the operations 604-618. Thus, the process 600 illustrates a robust technique for estimating or otherwise determining a height of an object

EXAMPLE CLAUSES

A: A system comprising: one or more processors; and one or more non-transitory computer-readable media storing computer-executable instructions that, when executed, cause the one or more processors to perform operations comprising: receiving lidar data captured by a lidar sensor of an autonomous vehicle; associating the lidar data with a two-dimensional data representation; receiving an indication of a ground surface represented in the two-dimensional data representation; removing a first subset of lidar data associated with the ground surface from the two-dimensional data representation to determine a second subset of data; determining, based at least in part on data clustering, object data in the second subset of data representing an object; determining a first height associated with the object based at least in part on a vertical extent of the object data; determining a second height associated with the object based at least in part on a vertical distance between a lidar data point of a first channel of the two-dimensional data representation and a height associated with a second channel of the two-dimensional data representation; and controlling the autonomous vehicle based at least in part on at least one of the first height or the second height associated with the object.

B: The system of paragraph A, wherein the vertical distance is a first distance, the data clustering comprising: determining a second distance between a first data point of the lidar data and a second data point of the lidar data; and determining the object data based at least in part on the second distance.

C: The system of paragraph A or B, wherein the object is a first object, and wherein: first data associated with the first channel represents a first portion of the object data; second data associated with the second channel represents a second object different than the first object; and the vertical distance represents a distance between the first data and a ray associated with the second data, wherein the ray is based least in part on the second object and an origin associated with the lidar sensor.

D: The system of any of paragraphs A-C, wherein: the vertical distance is a first distance; and the second height is based at least in part on a second distance between the object and a location associated with the lidar sensor.

E: The system of any of paragraphs A-D, wherein: a first dimension of the two-dimensional data representation represents an azimuth bin associated with the lidar data; and a second dimension of the two-dimensional data representation represents a beam index associated with the lidar data.

F: A method comprising: receiving data captured by a sensor of a vehicle; associating the data with a two-dimensional data representation; determining, based at least in part on data clustering, object data representing an object; determining, as a height associated with the object, at least one of: a first height associated with the object based at least in part on an extent of the object data; or a second height associated with the object based at least in part on a distance between a first position in a first channel of the two-dimensional data representation and a second position in a second channel of the two-dimensional data representation; and controlling the vehicle based at least in part on the height associated with the object.

G: The method of paragraph F, wherein the distance is a first distance, the data clustering comprising: determining a second distance between a first data point of the data and a second data point of the data, wherein the second distance is a three-dimensional Euclidian distance; and determining the object data based at least in part on the distance.

H: The method of paragraph F or G, wherein the object is a first object, and wherein: first data associated with the first channel represents a first portion of the object data; second data associated with the second channel represents a second object different than the first object; and the distance represents a vertical distance between the first data and a ray associated with the second data, wherein the ray is based least in part on the second object and a location associated with the sensor.

I: The method of paragraph H, wherein the distance is a first distance, the method further comprising: determining a second distance between the first data and the location associated with the sensor; determining a third distance between the second data and the location associated with the sensor; determining that the second distance is less than the third distance; and determining the second height based at least in part on the second distance being less than the third distance.

J: The method of any of paragraphs F-I, further comprising: receiving an indication of a ground represented in the data; and removing, from the two-dimensional data representation, a subset of the data based at least in part on the ground.

K: The method of any of paragraphs F-J, wherein: the first height represents a minimum height associated with the object; and the second height represents a maximum height associated with the object.

L: The method of any of paragraphs F-K, wherein: the distance is a first distance; the data is captured by a lidar sensor; the second height is based at least in part on a vertical distance between a first beam of the lidar sensor and a second beam of the lidar sensor; and the vertical distance is based at least in part on a second distance between the object and a location associated with the lidar sensor.

M: The method of any of paragraphs F-L, further comprising: determining the second height based at least in part on a location of the object above a ground surface.

N: The method of any of paragraphs F-M, wherein: the data is lidar data captured by a lidar sensor; a first dimension of the two-dimensional data representation represents an azimuth bin associated with the lidar data; and a second dimension of the two-dimensional data representation represents a beam index associated with the lidar data.

O: A non-transitory computer-readable medium storing instructions executable by a processor, wherein the instructions, when executed, cause the processor to perform operations comprising: receiving data captured by a sensor of a vehicle; associating the data with a two-dimensional data representation; determining, based at least in part on data clustering, object data representing an object; determining, as a height associated with the object, at least one of: a first height associated with the object based at least in part on an extent of the object data; or a second height associated with the object based at least in part on a vertical distance between a first position in a first channel of the two-dimensional data representation and a ray in a second channel of the two-dimensional data representation, wherein the ray is based at least in part on the sensor; and controlling the vehicle based at least in part on the height associated with the object.

P: The non-transitory computer-readable medium of paragraph O, wherein the vertical distance is a first distance, the data clustering comprising: determining a second distance between a first data point of the data and a second data point of the data, wherein the second distance is a three-dimensional Euclidian distance; and determining the object data based at least in part on the distance.

Q: The non-transitory computer-readable medium of paragraph O or P, wherein the object is a first object, and wherein: first data associated with the first channel represents a first portion of the object data; second data associated with the second channel represents a second object different than the first object; and the vertical distance represents a distance between the first data and a ray associated with the second data, wherein the ray is based least in part on the second object and a location associated with the sensor.

R: The non-transitory computer-readable medium of any of paragraphs O-Q, wherein: the data is captured by a lidar sensor; the second height is based at least in part on a vertical distance between a first beam of the lidar sensor and a second beam of the lidar sensor; and the vertical distance is based at least in part on a distance between the object and a location associated with the lidar sensor.

S: The non-transitory computer-readable medium of any of paragraphs O-R, determining the second height based at least in part on a location of the object above a ground surface.

T: The non-transitory computer-readable medium of any of paragraphs O-S, wherein: the data is lidar data captured by a lidar sensor; a first dimension of the two-dimensional data representation represents an azimuth bin associated with the lidar data; and a second dimension of the two-dimensional data representation represents a beam index associated with the lidar data.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing computer-executable instructions that, when executed, cause the one or more processors to perform operations comprising:
receiving lidar data captured by a lidar sensor of an autonomous vehicle;
associating the lidar data with a two-dimensional data representation, wherein a vertical dimension is represented by a plurality of channels and a horizontal dimension is represented by a plurality of bins;
receiving an indication of a ground surface represented in the two-dimensional data representation;
removing a first subset of lidar data associated with the ground surface from the two-dimensional data representation to determine a second subset of data;
determining, based at least in part on data clustering, object data in the second subset of data representing an object;
determining a first height associated with the object based at least in part on a vertical extent of the object data represented across a portion of the plurality of channels, wherein the first height represents a minimum height associated with the object bounded by the portion of the plurality of channels;
determining a second height associated with the object based at least in part on a vertical distance between a lidar data point of a first channel of the plurality of channels of the two-dimensional data representation and a height associated with a second channel of the plurality of channels of the two-dimensional data representation, wherein the second height represents a maximum height associated with the object bounded by the portion of the plurality of channels and at least one additional upper channel, an additional lower channel, or a ground surface; and
controlling the autonomous vehicle based at least in part on the first height and the second height associated with the object.

2. The system of claim 1, wherein the vertical distance is a first distance, the data clustering comprising:
determining a second distance between a first data point of the lidar data and a second data point of the lidar data; and
determining the object data based at least in part on the second distance.

3. The system of claim 1, wherein the object is a first object, and wherein:
first data associated with the first channel of the plurality of channels represents a first portion of the object data;
second data associated with the second channel of the plurality of channels represents a second object different than the first object; and
the vertical distance represents a distance between the first data and a ray associated with the second data, wherein the ray is based least in part on the second object and an origin associated with the lidar sensor.

4. The system of claim 1, wherein:
the vertical distance is a first distance; and
the second height is based at least in part on a second distance between the object and a location associated with the lidar sensor.

5. The system of claim 1, wherein:
a bin of the plurality of bins represents an azimuth bin associated with the lidar data; and
a channel of the plurality of channels represents a beam index associated with the lidar data.

6. A method comprising:
receiving data captured by a sensor of a vehicle;
associating the data with a two-dimensional data representation, wherein a vertical dimension is represented by a plurality of channels and a horizontal dimension is represented by a plurality of bins;
determining, based at least in part on data clustering, object data representing an object;
determining, height data of the object comprising:
a first height associated with the object based at least in part on an extent of the object data represented across a portion of the plurality of channels, wherein the first height represents a minimum height associated with the object bounded by the portion of the plurality of channels; and
a second height associated with the object based at least in part on a distance between a first position in a first channel of the plurality of channels of the two-dimensional data representation and a second position in a second channel of the plurality of channels of the two-dimensional data representation, wherein the second height represents a maximum height associated with the object bounded by the portion of the plurality of channels and at least one additional upper channel, an additional lower channel, or a ground surface; and
controlling the vehicle based at least in part on the height data of the object.

7. The method of claim 6, wherein the distance is a first distance, the data clustering comprising:
determining a second distance between a first data point of the data and a second data point of the data, wherein the second distance is a three-dimensional Euclidian distance; and
determining the object data based at least in part on the distance.

8. The method of claim 6, wherein the object is a first object, and wherein:
first data associated with the first channel of the plurality of channels represents a first portion of the object data;
second data associated with the second channel of the plurality of channels represents a second object different than the first object; and
the distance represents a vertical distance between the first data and a ray associated with the second data, wherein the ray is based least in part on the second object and a location associated with the sensor.

9. The method of claim 8, wherein the distance is a first distance, the method further comprising:
determining a second distance between the first data and the location associated with the sensor;
determining a third distance between the second data and the location associated with the sensor;
determining that the second distance is less than the third distance; and
determining the second height based at least in part on the second distance being less than the third distance.

10. The method of claim 6, further comprising:
receiving an indication of a ground represented in the data; and
removing, from the two-dimensional data representation, a subset of the data based at least in part on the ground.

11. The method of claim 6, wherein:
the distance is a first distance;
the data is captured by a lidar sensor;
the second height is based at least in part on a vertical distance between a first beam of the lidar sensor and a second beam of the lidar sensor; and
the vertical distance is based at least in part on a second distance between the object and a location associated with the lidar sensor.

12. The method of claim 6, further comprising:
determining the second height based at least in part on a location of the object above the ground surface.

13. The method of claim 6, wherein:
the data is lidar data captured by a lidar sensor;
a bin of the plurality of bins represents an azimuth bin associated with the lidar data; and
a channel of the plurality of channels represents a beam index associated with the lidar data.

14. A non-transitory computer-readable medium storing instructions executable by a processor, wherein the instructions, when executed, cause the processor to perform operations comprising:
receiving data captured by a sensor of a vehicle;
associating the data with a two-dimensional data representation, wherein a vertical dimension is represented by a plurality of channels and a horizontal dimension is represented by a plurality of bins;
determining, based at least in part on data clustering, object data representing an object;
determining, height data of the object comprising:
a first height associated with the object based at least in part on an extent of the object data represented across a portion of the plurality of channels, wherein the first height represents a minimum height associated with the object bounded by the portion of the plurality of channels; and
a second height associated with the object based at least in part on a vertical distance between a first position in a first channel of the plurality of channels of the two-dimensional data representation and a ray in a second channel of the plurality of channels of the two-dimensional data representation, wherein the ray is based at least in part on the sensor, and wherein the second height represents a maximum height associated with the object bounded by the portion of the plurality of channels and at least one additional upper channel, an additional lower channel, or a ground surface; and
controlling the vehicle based at least in part on the height data of the object.

15. The non-transitory computer-readable medium of claim 14, wherein the vertical distance is a first distance, the data clustering comprising:
determining a second distance between a first data point of the data and a second data point of the data, wherein the second distance is a three-dimensional Euclidian distance; and
determining the object data based at least in part on the second distance.

16. The non-transitory computer-readable medium of claim 14, wherein the object is a first object, and wherein:
first data associated with the first channel of the plurality of channels represents a first portion of the object data;
second data associated with the second channel of the plurality of channels represents a second object different than the first object; and
the vertical distance represents a distance between the first data and a ray associated with the second data, wherein the ray is based least in part on the second object and a location associated with the sensor.

17. The non-transitory computer-readable medium of claim 14, wherein:
the data is captured by a lidar sensor;
the second height is based at least in part on a vertical distance between a first beam of the lidar sensor and a second beam of the lidar sensor; and
the vertical distance is based at least in part on a distance between the object and a location associated with the lidar sensor.

18. The non-transitory computer-readable medium of claim 14, determining the second height based at least in part on a location of the object above the ground surface.

19. The non-transitory computer-readable medium of claim 14, wherein:
the data is lidar data captured by a lidar sensor;
a bin of the plurality of bins represents an azimuth bin associated with the lidar data; and
a channel of the plurality of channels represents a beam index associated with the lidar data.

* * * * *